United States Patent [19]

Kennel

[11] 4,275,605
[45] Jun. 30, 1981

[54] ACCELERATION SENSITIVE GYROSCOPE STABILIZED PLATFORM

[75] Inventor: John M. Kennel, Santa Ana, Calif.

[73] Assignee: Rockwell International Corporation, El Segundo, Calif.

[21] Appl. No.: 968,998

[22] Filed: Dec. 13, 1978

[51] Int. Cl.³ ............................................. G01C 19/54
[52] U.S. Cl. ..................................... 74/5.34; 73/504; 74/5.4
[58] Field of Search ........................ 74/5.34, 5.4, 5.22; 73/504, 505

[56] References Cited

U.S. PATENT DOCUMENTS

| | | | |
|---|---|---|---|
| 2,969,681 | 1/1961 | Beasley | 74/5.34 X |
| 3,251,233 | 5/1966 | Duncan et al. | 74/5.4 X |
| 3,308,670 | 3/1967 | Granqvist | 74/5.34 |
| 3,335,614 | 8/1967 | Ellis | 74/5.34 |
| 3,509,765 | 5/1970 | Stevenson et al. | 74/5.34 X |
| 3,672,229 | 6/1972 | Granqvist | 74/504 |

Primary Examiner—Rodney H. Bonck
Attorney, Agent, or Firm—H. Fredrick Hamann; Rolf M. Pitts; E. A. Sokolski

[57] ABSTRACT

An inertial measuring unit which precesses about the direction of apparent acceleration as a consequence of the introduction of a mass unbalance to each of the gyroscopes in the inertial measuring unit. The mass unbalances and the rotational moments of inertia of the gyroscopes are carefully controlled so that all gyroscopes within the inertial measuring unit precess at the same rate about any apparent acceleration. The precession of gyroscopes causes certain of the gyroscope errors to be averaged about zero thus reducing the error in the inertial measuring unit. The effect of precession upon the spatial orientation of the inertial measuring unit is compensated for by sensing the apparent acceleration and computationally compensating for the precession due to such acceleration.

5 Claims, 3 Drawing Figures

ACCELERATION SENSITIVE GYROSCOPE STABILIZED PLATFORM

This invention herein described was made in the course of or under a contract or subcontract thereunder with the Department of the Air Force.

BACKGROUND OF THE INVENTION

1. Field of the Invention

This invention pertains to gyroscopes. More particularly it pertains to gyroscopes used in inertial measuring units (IMU) for inertial navigation and to such inertial measuring units.

2. Description of Prior Art

Inertial navigation and guidance systems are used to measure changes in position and velocity of vehicles such as aircraft, missiles and ships. These changes in position and velocity are used by the inertial systems and/or associated equipment to generate current position and velocity information and in some applications to generate steering and propulsion control signals in accordance with predetermined guidance instructions.

Errors are always present in the measurement of position and velocity changes by such inertial systems. A significant part of the error in such measurements by inertial measuring units (IMU) is due to imperfections in the performance of the gyroscopes, the accelerometers and the associated equipment which form a part of the IMU.

An operating technique often used in the prior art to reduce the effect of certain types of errors in IMU's is to cause the stable platform which is a part of the IMU to rotate about its azimuthal axis (the azimuthal axis is defined here as being parallel to the direction of apparent acceleration). See for instance, U.S. Pat. No. 3,214,981. Azimuthal rotation, or carrousel operation, converts the effect of level gyro bias, accelerometer bias and accelerometer axis misalignment from that of a fixed error to that of an error which varies sinusoidally at the platform rotation frequency. Since, in the self-alignment mode, azimuthal alignment (coincidence of computer axes and platform axes about the vertical) accuracy is limited by level gyro bias uncertainty, carrousel operation leads to improved azimuthal alignment.

The amount of IMU accuracy improvement resulting from carrousel operation depends upon the IMU application e.g. ballistic missile guidance, aircraft or ship navigation. The amount of improvement depends upon the error correlation time of the gyro bias error and on other errors which are reduced by azimuthal rotation, and upon the azimuthal rotation rate.

In the prior art, stable platform azimuthal rotation normally is caused by electromagnetic torquers operating on the stabilization gyros. Electromagnetic torquers are limited in range and accuracy so that in practice the azimuthal rotation rates obtained in the prior art in precise applications are limited to 15 to 90 degree per hour. Higher IMU accuracy, however, would be achieved if precise means were available for causing a high rate of rotation of the stable platform. For example, if a precise rotation rate of 720°/hr were used, then bias stabilities of only 30 minutes rather than 4 to 24 hours would be needed to obtain improved accuracy of operation.

SUMMARY OF THE INVENTION

In the system of this invention, precise, high rate, azimuthal rotation is obtained by the use of inertial forces rather than by electromagnetic forces. Inertial rotation is achieved by building each of the IMU stabilization gyroscopes with a fixed mass unbalance along its spin axis. As a consequence when the vehicle containing the IMU is stationary on the earth the IMU rotates about the local vertical at a rate proportional to the mass unbalance, the reciprocal of the angular momentum of the gyroscope, and the "g", the apparent acceleration due to gravity. When the vehicle containing the IMU is accelerated, the rotation of the IMU is about, and proportional to, the sensed acceleration, i.e. $\vec{A} = \vec{R} - \vec{g}$, where $\vec{R}$ is the second time derivative of position with respect to inertial space, $\vec{A}$ is the sensed acceleration and $\vec{g}$ is the apparent acceleration due to gravity. Means for sensing acceleration suitable for use in this invention are described in "Inertial Guidance," edited by G. R. Pitman, John Wiley & Sons, New York 1962, Chapters 2 and 3.

Thus by only a minor modification in gyro construction so as to provide mass unbalance, a gyro-stabilized platform is made to rotate about the apparent acceleration. When the stable platform is stationary on Earth, the rotation rate will be proportional to gravity and can be as much as 24 (or more) times faster than that commonly achieved by electromagnetic torqueing. This rotation rate is highly stable since it depends only on gravity, mass stability and the control of the rotation rate of each gyroscope.

The acceleration sensitive gyro stabilized platform of this invention (ASGSP) is different from the gyro-stabilized platforms used in IMUs in the prior art in that this invention uses gyroscopes designed with specific mass unbalances and for which the ratio of mass unbalance moment to angular momentum (M/H) is accurately controlled to be the same for each gyroscope on the platform. The ASGSP employs accelerometers, gimbals (or the functional equivalent), gimbal angle resolvers and support electronics just as usual gyro stabilized platforms do. Functionally, however, this invention (the ASGSP) is different from the gyro stabilized platforms in the prior art in that it rotates about the sensed acceleration vector at a rate proportional to the magnitude of sensed acceleration. The ASGSP is similar to the prior art gyro-stabilized platforms in that the ASGSP also may be torqued via electromagnetic torquers and in that it will have drift due to instrument errors.

An inertial navigation and guidance system incorporating this invention (the ASGSP) must use a set of mechanization equations in its associated computer which takes into account the dependance of the platform rotation rate on acceleration. Alignment of such system is most conveniently done by self alignment techniques. Since the error correlation times of many of the significant errors within the IMU are greatly reduced by the rapid rotation, the alignment accuracy of the IMU is increased and the required alignment time is reduced by the rapid rotation rates. The averaging time required for alignment also is reduced by the increase in rotation rate. In other respects the accuracy of alignment is similar to the self alignment systems of the prior art.

In order to obtain stable platform rotation rates proportional to acceleration it is necessary that the ratio of the moment of the mass unbalance to the angular momentum be the same for each gyroscope. To achieve this result the unbalances in the gyroscopes must be selected carefully during manufacture and the rotation rates for the gyroscopes must be accurately controlled during operation. The rotational moment of inertia, H, for each gyroscope is adjusted by adjusting the gyro wheel rotation rate to the desired value. The rotation rate could be controlled by a synchronous gyro drive motor for which the frequency of the motor voltage is adjusted to a desired value by means of phaselocked loop techniques. A crystal stabilized reference frequency, and digital phase-locked loop speed control of the gyro can provide an accurate and constant value of angular momentum for each gyroscope. However, in the best mode, as described below, a rotation sensor in conjunction with a frequency standard and a feedback loop and an asynchronous drive motor can also be used to accurately control rotation rates.

DESCRIPTION OF THE PREFERRED EMBODIMENT

Figure 1:
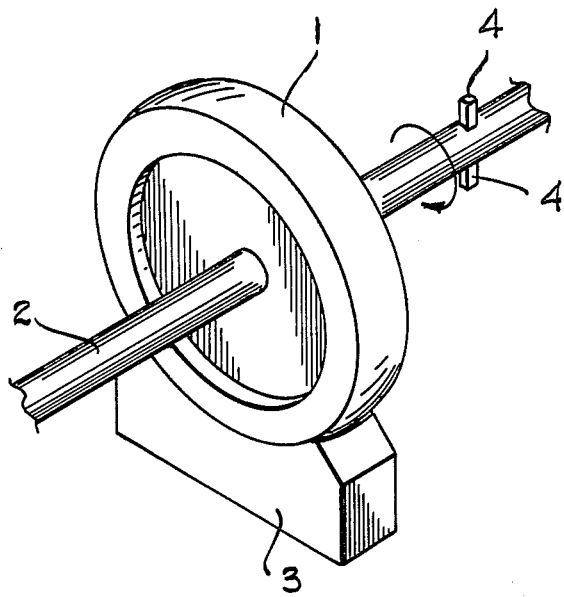
FIG. 1 illustrates conceptually the addition of an unbalance to a gyroscope.

In the system of this invention, an unbalance is added to each gyroscope in an inertial measuring unit (IMU). FIG. 1 illustrates conceptually the manner in which the unbalance is added. Normally the unbalance is added in a symmetrical fashion about the rotational axis of the gyroscope so as not to disturb its rotational properties. In the gyroscope illustrated in FIG. 1, an inertial mass 1 which rotates about an axis 2 forms a gyroscope. Normally the center of mass of the gyroscope is oriented so as to coincide with the center of support 3 so that the gyroscope will be insensitive to translational accelerations. However in the system of this invention, an unbalance 4 is added to the gyroscope in a symmetrical manner about its axis of rotation, so as not to disturb its rotational properties, but so as to create a torque about the support 3 whenever the gyroscope undergoes a translational acceleration. The torque resulting from the unbalance causes the gyroscope to precess about the direction of the apparent acceleration. Gyro mass balance techniques are described in some detail in "Gyroscopes: Theory and Design", by Paul H. Savet, McGraw-Hill, New York, 1961, p. 223 et seq.

Figure 2:
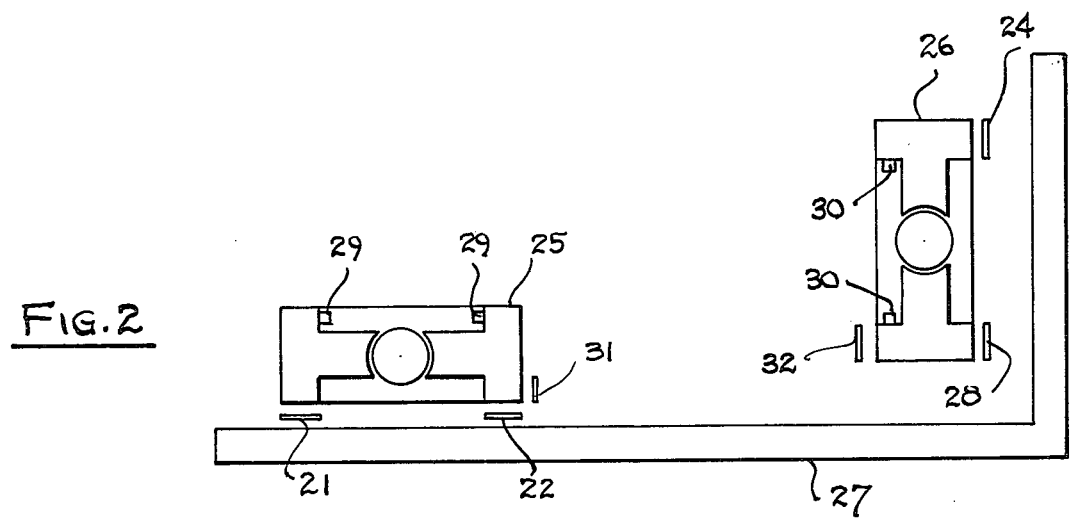
FIG. 2 illustrates the combination of two free-rotor gyroscopes, such as those described in U.S. Pat. No. 3,251,233, to form part of the gyroscopes on a stable platform.

FIG. 2 illustrates the combination of two free-rotor gyroscopes, such as those described in U.S. Pat. No. 3,251,233, to form part of the acceleration sensitive gyroscope stabilized platform. As described in detail in U.S. Pat. No. 3,251,233, sensing elements 21-22 and 24-28 sense any changes in the orientations of gyroscopes 25 and 26 with respect to platform 27 and, by means of position servos such as those described in said patent, cause the platform 27 to follow any such changes in orientation. The unbalancing weights at 29 and 30 added to gyroscopes 25 and 26 and the rotation rates of the gyroscopes are carefully selected and the rotation rate of each gyroscope is accurately controlled so that gyroscopes 25 and 26 will precess at the same rate about the direction of any apparent acceleration. In the best mode, the rotational rate of each gyroscope is controlled by sensors 31 and 32 which, by optical or magnetic means, measure the rotation rates of the gyroscopes and, in turn, cause the rotational driving motors to be adjusted so as to maintain the predetermined rates of rotation. As indicated above, frequency controlled, synchronous drive motors could be used for this purpose; however, in the best mode described here, asynchronous drive motors are used, in conjunction with rotational rate sensors, frequency references and feedback loops, to control the rates of rotation. Oscillators suitable for use in this invention are described in "Electronic Engineers Handbook" by P. G. Fink and A. A. McKenzie, McGraw Hill, New York 1975, p. 13-1 et seq. Rotational driving mechanisms and sensing mechanisms suitable for use in this invention are described in Savet Id., at p. 314 et seq.

Although two free-axis gyroscopes are illustrated in FIG. 2, the system of this invention will also operate with three gyroscopes each of which is contrained so as to precess only about one axis.

Figure 3:
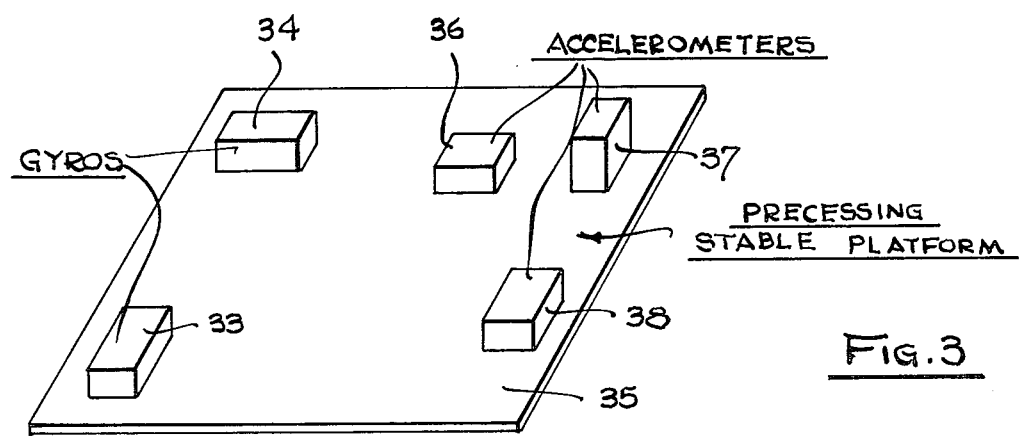
FIG. 3 shows the combination of two free-rotor gyroscopes and three accelerometers on the stable platform which platform precesses about the apparent acceleration.

FIG. 3 illustrates the combination of two free-rotor gyroscopes 33 and 34 on stable platform 35 together with three accelerometers 36, 37 and 38. The platform 35 together with the gyroscopes and accelerometers are mounted by gimbals or other means within the vehicle containing the ASGSP so that the platform is free to precess about the direction of any apparent acceleration.

For the precession rates exhibited by this invention, the acceleration of the accelerometers and the gyroscopes due to such precession is negligible. However, as a consequence of the precession the calculation of position and velocity for an acceleration sensitive gyroscope stabilized platform such as this invention is somewhat different from that of an IMU used in the prior art.

In a system of the prior art the velocity $\vec{V}$ of the vehicle containing the IMU is given by:

$$\vec{V} = \int [\vec{A} - (\vec{W}_d + \vec{W}_E + \vec{\Omega}) \times \vec{V} - \vec{\Omega} \times (\vec{\Omega} \times \vec{R}) + \vec{g}] dt \quad (1)$$

where
  $\vec{V}$ is the IMU velocity with respect to Earth
  $\vec{W}_d$ is gyro error rate
  $\vec{W}_E$ is gyro rotation rate due to applied electrical torque
  $\vec{\Omega}$ is Earth rate
  $\vec{R}$ is IMU position with respect to the Earth
  $\vec{g}$ is gravity For the system of this invention the equation must be modified as follows to correct for acceleration sensitive rotation.

$$\vec{V} = \int [\vec{A} + \frac{M}{H} \vec{A} \times \vec{V} - (\vec{W}_d + \vec{W}_E + \vec{\Omega}) \times \vec{V} - \vec{\Omega} \times (\vec{\Omega} \times \vec{R}) + \vec{g}] dt \quad (2)$$

In other words, in accordance with the concept of the invention, the term, $(M/H) \vec{A} \times \vec{V}$, is added to the mechanization of Equation (1) by the platform computer where:
  M = gyro unbalance moment
  H = gyro angular momentum.

Such modification merely involves gain-scaling the vector $\vec{A}$ by the scalar factor (M/H) and then determining the vector cross product of the gain-scaled acceleration vector (M/H) $\vec{A}$ and velocity vector, $\vec{V}$ in the manner of like operations on other terms in Equation (1), as is well understood in the art.

As in the systems of the prior art an integration of the velocity vector obtained from these equations yields the current position of the vehicle containing the ASGSP. The measurement of orientation and acceleration by means of IMU's is described in some detail in Chapter 1-6 of "Intertial Guidance" edited by G. R. Pitman, John Wiley & Sons, New York, 1962.

I claim:

1. A method for reducing operating errors in a gyroscope comprising:
   (a) introducing a preselected mass unbalance along the axis of the gyroscope so as to cause precession of the gyroscope about the direction of any apparent acceleration,
   (b) measuring the precession rate of the gyroscope due to any apparent acceleration,
   (c) sensing the apparent acceleration of the gyroscope by means of accelerometers mounted on a platform containing the gyroscope, and
   (d) compensating for a precession of said gyroscope about any apparent acceleration by sensing the apparent acceleration and calculating and computationally compensating for the precession due to any such apparent acceleration.

2. A method for reducing operating errors in an inertial measuring unit comprising:
   (a) introducing a preselected mass unbalance along the axis of each stabilization gyroscope of an inertial measuring unit so as to cause precession of each gyroscope about the direction of apparent acceleration of the inertial measuring unit,
   (b) adjusting the mass unbalances and precessing rates of the gyroscopes so that all gyroscopes in the inertial measuring unit precess at the same rate about the direction of any apparent acceleration,
   (c) accurately measuring a precessing rate of the inertial measuring unit due to acceleration,
   (d) sensing the apparent acceleration of the inertial measuring unit by means of accelerometers mounted on the platform of the inertial measuring unit, and
   (e) calculating the inertial measuring unit position and velocity from the measured acceleration taking into account platform rotation rate due to acceleration and the effects of time, gravity and earth rate.

3. The method of claim 1 in which said step of compensating includes modification of the indicated platform velocity to correct for acceleration-sensitive rotation of the platform in accordance with the relationship:

$$\Delta V_{correction} = \frac{M}{H} \vec{A} \times \vec{V}$$

where
   M = gyro unbalanced moment
   H = angular momentum of the gyro
   A = sensed platform acceleration
   V = platform velocity vector.

4. A system for reducing operating errors in a gyroscope comprising:
   (a) a platform,
   (b) a gyroscope mounted on the platform with at least one degree of orientational freedom,
   (c) a plurality of accelerometers mounted on the platform for sensing the apparent acceleration of the platform,
   (d) means for measuring the rate of precession of the gyroscope,
   (e) means for accurately measuring a rate of precession of the gyroscope due to acceleration, and
   (f) means for compensating for the precession of the gyroscope about the direction of any acceleration by computing the precession of the gyroscope due to any apparent acceleration and computationally compensating for the precession.

5. A system for reducing operating errors in an inertial measuring unit comprising:
   (a) an inertial measuring unit comprising a plurality of gyroscopes, each having mass unbalances and a plurality of accelerometers,
   (b) means for accurately adjusting and controlling the rotational moments of inertia of each of the gyroscopes so as to cause all of the gyroscopes to precess at the same rate about the direction of any apparent acceleration,
   (c) means for determining a precessing rate of the inertial measuring unit due to apparent acceleration,
   (d) said accelerometers sensing the apparent acceleration of the inertial measuring unit, and
   (e) means for compensating for a precession of the inertial measuring unit about any apparent acceleration by computing the precession due to any such acceleration and computationally compensating for the precession.

* * * * *